United States Patent
Li et al.

(10) Patent No.: US 10,672,117 B2
(45) Date of Patent: Jun. 2, 2020

(54) PANEL LIGHT-ON APPARATUS, PANEL LIGHT-ON TESTING SYSTEM AND PANEL LIGHT-ON TESTING METHOD

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventors: Qiang Li, Guangdong (CN); Chien Pang Lee, Guangdong (CN); Ting Dou, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 222 days.

(21) Appl. No.: 15/745,114

(22) PCT Filed: Oct. 23, 2017

(86) PCT No.: PCT/CN2017/107345
§ 371 (c)(1),
(2) Date: Jan. 15, 2018

(87) PCT Pub. No.: WO2019/061608
PCT Pub. Date: Apr. 4, 2019

(65) Prior Publication Data
US 2019/0385301 A1    Dec. 19, 2019

(30) Foreign Application Priority Data
Sep. 30, 2017 (CN) .......................... 2017 1 0937235

(51) Int. Cl.
*G06T 7/00* (2017.01)
*G09G 3/34* (2006.01)

(52) U.S. Cl.
CPC ......... *G06T 7/0008* (2013.01); *G09G 3/3406* (2013.01); *G06T 2207/30121* (2013.01);
(Continued)

(58) Field of Classification Search
CPC ....... H01L 2224/29075; H01L 27/3293; H01L 27/3244; H01L 27/1214; H01L 27/1225;
(Continued)

(56) References Cited

U.S. PATENT DOCUMENTS

4,859,052 A * 8/1989 McFarland ............ A61B 3/028
351/239
6,362,802 B1 * 3/2002 Fujiwara ............... G06T 1/0007
345/87
(Continued)

*Primary Examiner* — Aklilu K Woldemariam
(74) *Attorney, Agent, or Firm* — Hemisphere Law, PLLC; Zhigang Ma (57) ABSTRACT

A panel light-on apparatus, panel light-on testing system and panel light-on testing method are provided. Wherein, the panel light-on apparatus comprises a supporting member; a workbench provided on the supporting member to hold and secure a tested panel; and a display panel located at bottom of the workbench to provide a backlight to the tested panel and display a predetermined image, wherein the predetermined image is projected to the tested panel and overlapped with an image displayed by the tested panel. Through adding the display panel, not only a backlight for the tested panel, but also real-time displaying defect images are provided to assist in determining the cause of the defect; and the display range of the display panel can be adjusted in accordance with the sizes of different tested panels to achieve the purpose of light-proofing of other non-test panel areas on the workbench.

7 Claims, 6 Drawing Sheets

(52) U.S. Cl.
CPC .............. *G06T 2207/30164* (2013.01); *G09G 2340/04* (2013.01); *G09G 2360/145* (2013.01)

(58) Field of Classification Search
CPC . H01L 51/0097; H01L 31/054; G02F 1/1303; G02F 1/13338; G02F 2001/134354; G02F 1/133308; G02F 2001/134345; G02F 1/133512; G02F 1/133516; G02F 2001/133773; G02F 2201/54; G02F 1/1368; G06F 1/1616; G06F 1/1641; G06F 3/04164; G06F 3/0443; G06F 3/0484; G09G 2300/08; G09G 2300/0404; G09G 2320/0693; G09G 2370/047; G09G 3/2092; G09G 3/3648; G09G 3/3426; G09G 3/2018; G09G 3/006; G09G 2310/0278; G09G 2340/12; H01J 9/02; H01J 2201/319; Y10T 29/43; Y10T 29/49004; G06T 2207/10012; G06T 2207/30121; G06T 7/001; H04N 17/02; H04N 17/04; H04N 5/70; H04M 1/0266
USPC ..... 382/149, 190; 345/87, 89, 204, 690, 698
See application file for complete search history.

(56) References Cited

U.S. PATENT DOCUMENTS

| | | | | |
|---|---|---|---|---|
| 7,860,296 B2* | 12/2010 | Kwon | ................... | G09G 3/006 382/141 |
| 2002/0196393 A1* | 12/2002 | Tashiro | ................. | G02F 1/1303 349/106 |
| 2005/0180083 A1* | 8/2005 | Takahara | ............... | G09G 3/006 361/152 |
| 2007/0170949 A1* | 7/2007 | Pak | ........................ | G09G 3/006 324/760.01 |
| 2007/0182441 A1* | 8/2007 | Hwang | ................ | G09G 3/3648 345/204 |
| 2007/0229420 A1* | 10/2007 | Hwang | .................. | G09G 3/006 345/87 |
| 2008/0001869 A1* | 1/2008 | Chung | ................. | G09G 3/3648 345/87 |
| 2008/0036715 A1* | 2/2008 | Lee | ........................ | G09G 3/006 345/87 |
| 2008/0036797 A1* | 2/2008 | Whang | ................. | G09G 3/006 345/698 |
| 2008/0049051 A1* | 2/2008 | Han | ....................... | G09G 3/006 345/690 |
| 2008/0068324 A1* | 3/2008 | Chung | .................. | G09G 3/006 345/98 |
| 2008/0252812 A1* | 10/2008 | Ohta | ................ | G02F 1/133308 349/61 |
| 2009/0073357 A1* | 3/2009 | Takahashi | ......... | G02F 1/133516 349/106 |
| 2009/0147186 A1* | 6/2009 | Nakai | ................. | G02F 1/13471 349/74 |
| 2009/0231497 A1* | 9/2009 | Takahashi | ........... | G02F 1/13338 349/1 |
| 2016/0103539 A1* | 4/2016 | Jinbo | .................... | G06F 3/0412 345/173 |
| 2017/0154947 A1* | 6/2017 | Nakamura | ......... | H01L 51/5284 |

* cited by examiner

PANEL LIGHT-ON APPARATUS, PANEL LIGHT-ON TESTING SYSTEM AND PANEL LIGHT-ON TESTING METHOD

RELATED APPLICATIONS

The present application is a National Phase of International Application Number PCT/CN2017/107345, filed on Oct. 23, 2017, and claims the priority of China Application No. 201710937235.7, filed on Sep. 30, 2017.

FIELD OF THE DISCLOSURE

The disclosure relates to a panel display technical field, and more particularly to a panel light-on apparatus, panel light-on testing system and panel light-on testing method.

BACKGROUND

Figure 1:
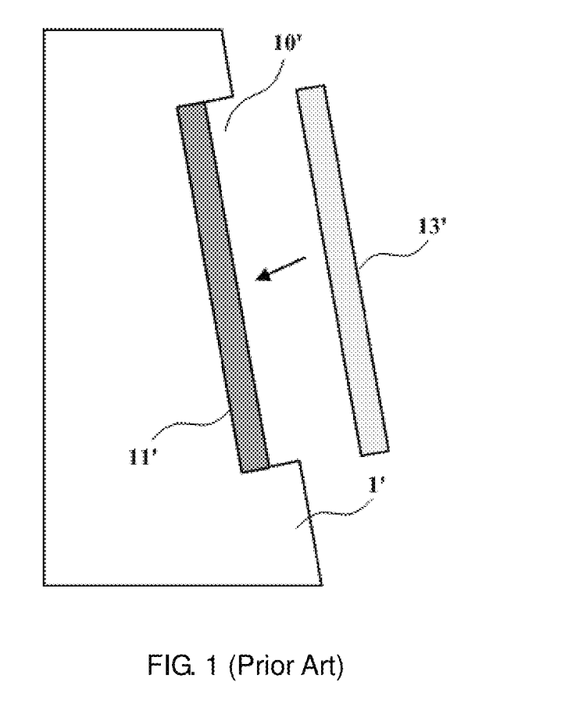
FIG. 1 is a structural schematic diagram of a panel light-on apparatus used nowadays.

Production of a variety of sizes of the panels are usually existed in a panel plant. In order to maintain the quality of mass-produced products, a light-on test on the different sizes of products need to be performed before being sold to exclude defective products. A panel light-on apparatus is necessary while performing analysis on the defective products. The panel light-on apparatus used nowadays is shown in FIG. 1. A workbench 10' is disposed on a supporting member 1' to hold and secure a tested panel 13', and a backlight unit 11' is disposed at bottom of the workbench 10' to provide backlight to the tested panel 13'. The tested panel 13' is controlled by a test signal to display white image, red image, green image, blue image, black image, grayscale image, etc. on the entire display area respectively for observing by the inspectors. Therefore, the light-on testing procedure is only for confirming the adverse phenomena.

SUMMARY

One of the technique problem to be solved by the present invention is to provide a panel light-on apparatus, a panel light-on testing system and a panel light-on testing method to benefit the detection staff to determine the cause of the defects and improve the testing efficiency.

In one aspect, the present invention provides a panel light-on apparatus, comprising:
a supporting member;
a workbench provided on the supporting member to hold and secure a tested panel; and
a display panel located at bottom of the workbench to provide a backlight to the tested panel and display a predetermined image, wherein the predetermined image is projected to the tested panel and overlapped with an image displayed by the tested panel.

In one embodiment, a size of a display area of the display panel is greater than or equal to the size of the display area of the tested panel.

In one embodiment, the predetermined image displayed by the display panel is a whole white image used as the backlight, or the predetermined image displayed by the display panel is a defect image of the tested panel photographed during a process manufacturing the tested panel.

In another aspect, the present invention further provides a panel light-on testing system, comprising:
a panel light-on apparatus, comprising:
a supporting member;
a workbench provided on the supporting member to hold and secure a tested panel; and
a display panel located at bottom of the workbench to provide a backlight to the tested panel and display a predetermined image, wherein the predetermined image is projected to the tested panel and overlapped with an image displayed by the tested panel;
a light-on apparatus controller electrically coupled to the display panel for controlling the display panel to display the predetermined image; and
a signal generator electrically coupled to the light-on apparatus controller and the tested panel for generating a light-on testing signal to control the tested panel to display a corresponding image.

In one embodiment, the panel light-on testing system further comprises an input apparatus electrically coupled to the light-on apparatus controller to mark a defect point on the tested panel while performing light-on test on the tested panel.

In one embodiment, the light-on apparatus controller comprises a screen displaying simultaneously with the display panel, the input apparatus marks on the display panel a position corresponding to the defect point, and the screen displays a coordinate information of the defect point.

In one embodiment, the light-on apparatus controller further acquires images of the tested panel photographed during a process, wherein each of the images of the tested panel photographed during the process shows the defect point at a same position, in accordance with an ID of the tested panel and the coordinate information of the defect point, and displays the images of the tested panel photographed during a process on the display panel.

In one embodiment, the light-on apparatus controller saves and transmits the images of the tested panel photographed during the process, wherein each of the images of the tested panel photographed during the process shows the defect point at the same position, to a FAB system.

In one embodiment, a size of a display area of the display panel is greater than or equal to the size of the display area of the tested panel, and the light-on apparatus controller adjusts a display range of the display panel in accordance with the size of the display area of the tested panel.

In a further aspect, the present invention further provides a panel light-on testing method, comprising:
sending a first control signal to a display panel from a light-on apparatus controller to display a whole white image on the display panel;
sending a second control signal to a signal generator from the light-on apparatus controller to generate a light-on testing signal by the signal generator to control a tested panel to display a corresponded image;
marking a defect point after finding the defect point in the tested panel; and
acquiring images of the tested panel photographed during a process, wherein each of the images of the tested panel photographed during the process shows the defect point at a same position, in accordance with an ID of the tested panel and a coordinate information of the defect point, and displaying the images of the tested panel photographed during the process on the display panel.

The beneficial effects of the embodiments of the present invention are: through adding a display panel capable of displaying any image at bottom of the workbench of the panel light-on apparatus, not only a backlight for the detection panel, but also real-time displaying defect images detected during the process are provided to assist the detection staff in determining the cause of the defect; through marking by the input apparatus the defect point found in the panel light-on testing process, images of the tested panel photographed during the process, wherein each of the images of the tested panel photographed during the process shows the defect point at a same position, can be acquired for the detection staff to make a judgement; and the display range of the display panel can be adjusted in accordance with the variety sizes of different tested panels to achieve the purpose of light-proofing of other non-test panel areas on the workbench, avoiding replacing fixture, reducing time and energy consumption, and improving the efficiency of light-on test.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The specific structural and functional details disclosed herein are only representative and are intended for describing exemplary embodiments of the disclosure. However, the disclosure can be embodied in many forms of substitution, and should not be interpreted as merely limited to the embodiments described herein.

In the description of the disclosure, terms such as "center", "transverse", "above", "below", "left", "right", "vertical", "horizontal", "top", "bottom", "inside", "outside", etc. for indicating orientations or positional relationships refer to orientations or positional relationships as shown in the drawings; the terms are for the purpose of illustrating the disclosure and simplifying the description rather than indicating or implying the device or element must have a certain orientation and be structured or operated by the certain orientation, and therefore cannot be regarded as limitation with respect to the disclosure. Moreover, terms such as "first" and "second" are merely for the purpose of illustration and cannot be understood as indicating or implying the relative importance or implicitly indicating the number of the technical feature. Therefore, features defined by "first" and "second" can explicitly or implicitly include one or more the features. In the description of the disclosure, unless otherwise indicated, the meaning of "plural" is two or more than two. In addition, the term "comprise" and any variations thereof are meant to cover a non-exclusive inclusion.

In the description of the disclosure, is should be noted that, unless otherwise clearly stated and limited, terms "mounted", "connected with" and "connected to" should be understood broadly, for instance, can be a fixed connection, a detachable connection or an integral connection; can be a mechanical connection, can also be an electrical connection; can be a direct connection, can also be an indirect connection by an intermediary, can be an internal communication of two elements. A person skilled in the art can understand concrete meanings of the terms in the disclosure as per specific circumstances.

The terms used herein are only for illustrating concrete embodiments rather than limiting the exemplary embodiments. Unless otherwise indicated in the content, singular forms "a" and "an" also include plural. Moreover, the terms "comprise" and/or "include" define the existence of described features, integers, steps, operations, units and/or components, but do not exclude the existence or addition of one or more other features, integers, steps, operations, units, components and/or combinations thereof.

The disclosure will be further described in detail with reference to accompanying drawings and preferred embodiments as follows.

Figure 2:
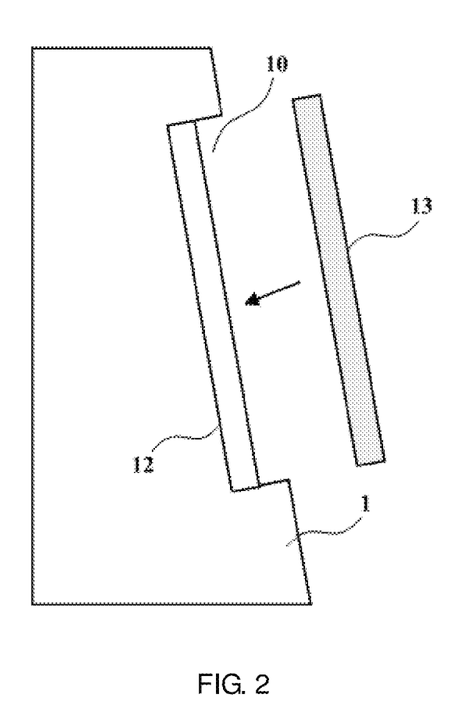
FIG. 2 is a structural schematic diagram of a panel light-on apparatus in accordance with a first embodiment of the present invention.

Please refer to FIG. 2, the first embodiment of the present invention provides a panel light-on apparatus, comprising:

a supporting member 1;

a workbench 10 provided on the supporting member 1 to hold and secure a tested panel 13; and a display panel 12 located at bottom of the workbench 10 to provide a backlight to the tested panel 13 and display a predetermined image, wherein the predetermined image is projected to the tested panel 13 and overlapped with an image displayed by the tested panel 13.

Figure 3:
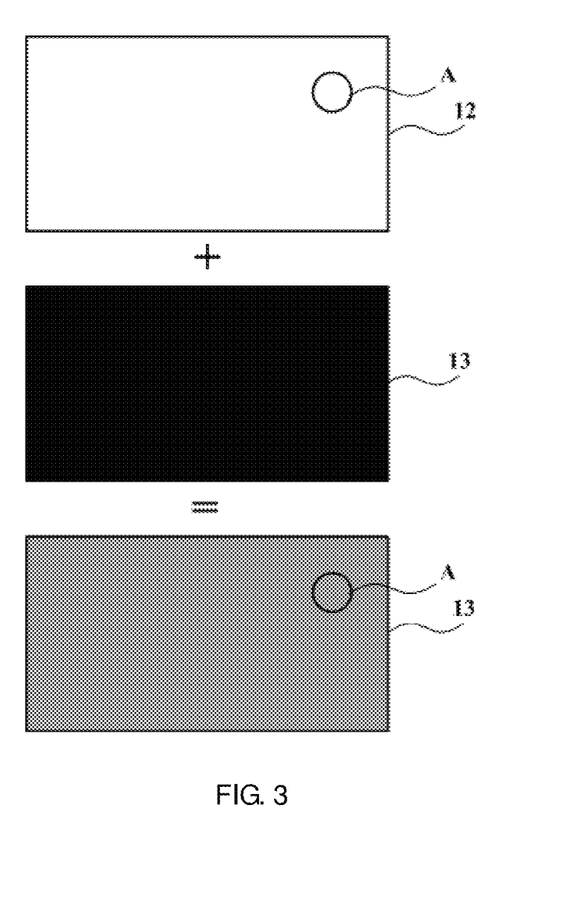
FIG. 3 is a schematic diagram showing the images displayed by the display panel being overlapping on the tested panel in one embodiment of the present invention.

The panel light-on apparatus comprises a display panel capable of displaying any image at the bottom of the workbench. For example, the display panel could display white image on the entire display area as being backlight of the tested panel, or the display panel could display images like circles, lines or boxes. As shown in FIG. 3, the display panel 12 is capable of displaying any image as described above, and, in this embodiment, a whole white frame with a black circle A thereon is displayed as the image by the display panel 12. The tested panel 13 is totally black when there is no control signal and backlight. When the backlight is turned on, the tested panel displays an image with only one single color, such as white, red, green, blue, black, grayscale, etc., on entire display area. At this time, the image having the whole white frame and the black circle A is overlapped on the image displayed by the test panel 13. Therefore, through adding the display panel 12 capable of displaying any image at bottom of the workbench 10, a defect image of the tested panel detected during a process manufacturing the tested panel 13 could be displayed real-time to assist the detection staff in determining the cause of the defect.

Furthermore, the size of the display area of the display panel 12 is greater than or equal to the size of the display area of the tested panel 13. Accordingly, when the tested panels 13 with different sizes are replaced on the workbench 10, the display range of the display area of the display panel 12 can be adjusted correspondingly to achieve the purpose of light-proofing of other non-test panel areas on the workbench 10, avoiding replacing fixture, reducing time and energy consumption, and improving the efficiency of light-on test.

Figure 4:
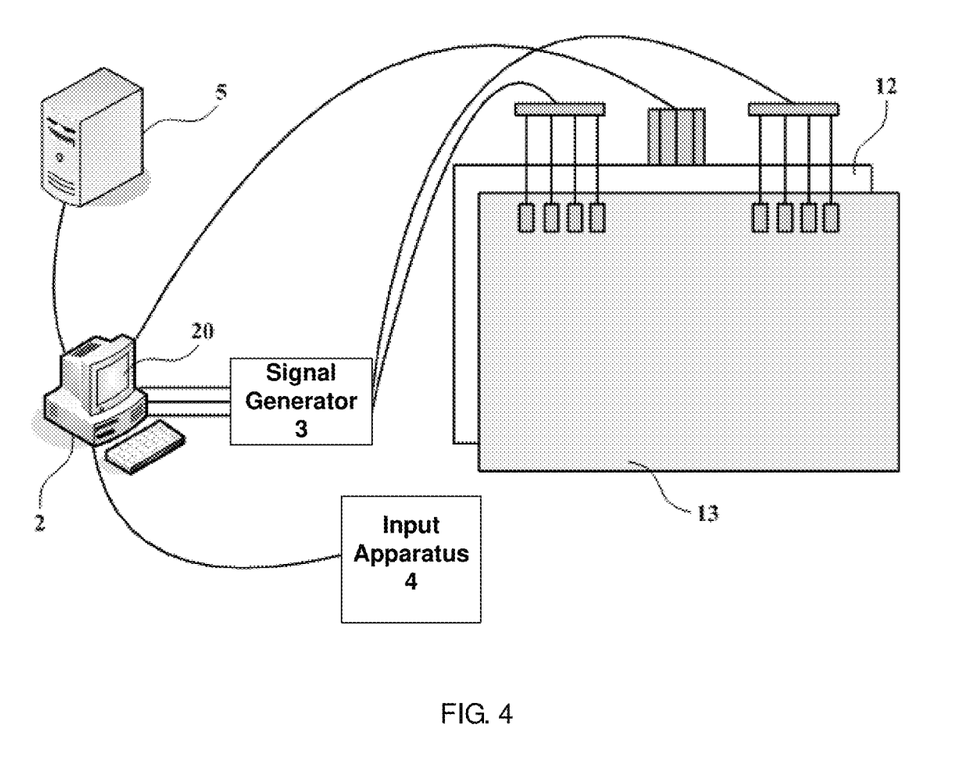
FIG. 4 is structural schematic diagram of a panel light-on testing system in accordance with a second embodiment of the present invention.

Please refer to FIG. 4. The second embodiment of the present invention provides a panel light-on testing system, comprising:

a panel light-on apparatus, comprising a supporting member 1; a workbench 10 provided on the supporting member 1 to hold and secure a tested panel 13; and a display panel 12 located at bottom of the workbench 10 to provide a backlight to the tested panel 13 and display a predetermined image, wherein the predetermined image is projected to the tested panel 13 and overlapped with an image displayed by the tested panel 13;

a light-on apparatus controller 2 electrically coupled to the display panel 12 for controlling the display panel 12 to display the predetermined image; and a signal generator 3 electrically coupled to the light-on apparatus controller 2 and the tested panel 13 for generating a light-on testing signal to control the tested panel 13 to display a corresponding image.

When the light-on test performed by the panel light-on testing system is started, a control signal (i.e., the first control signal) is firstly sent to the display panel 12 from the light-on apparatus controller 2 to display white image on the entire display area of the display panel 12 (equivalent to provide backlight). After that, another control signal (i.e., the second control signal) is sent to the signal generator 3 from the light-on apparatus controller 2 to generate a corresponded light-on testing signal from the signal generator 3. The light-on testing signal controls the tested panel 13 to display on entire display area a white image, a red image, a green image, a blue image, a greyscale image and a black image in sequence. The detection staff observes the phenomena of the light-on process to find defect points. Through pointing by the input apparatus 4, the light-on apparatus controller 2 records the coordinate information of the position of the defect point. It is noted that, the light-on apparatus controller 2 comprises a screen 20 displaying simultaneously with the display panel 12. When the detection staff finds the defect point in the tested panel 13, the input apparatus 4 is operated to mark the position of the defect point on the screen 20. Because the image (a whole white image now) is displayed and overlapped on the tested panel 13, the pointer of the input apparatus 4 on the screen 20 is existed on the display panel 12, too. Therefore, the position of the defect point in the tested panel 13 marked by the input apparatus is displayed on the display panel 12 (and is simultaneously displayed on the screen 20 of the light-on apparatus controller 2).

Figure 5:
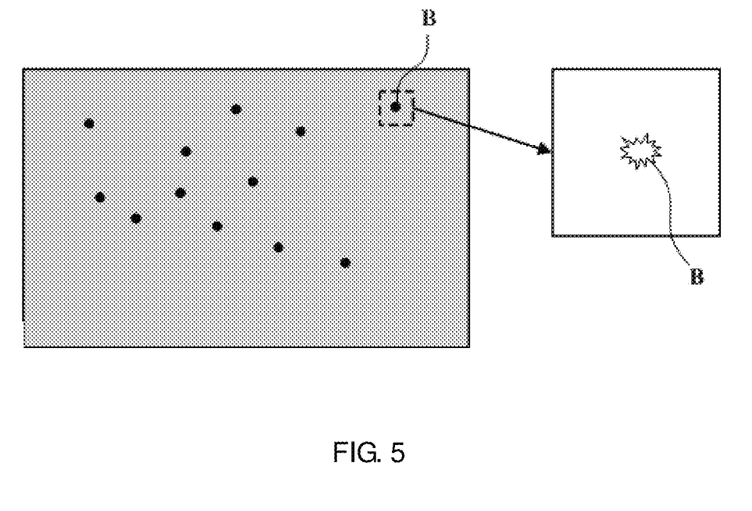
FIG. 5 is a schematic diagram showing photographing the position of the defect point in the tested panel in one embodiment of the present invention.
Figure 6:
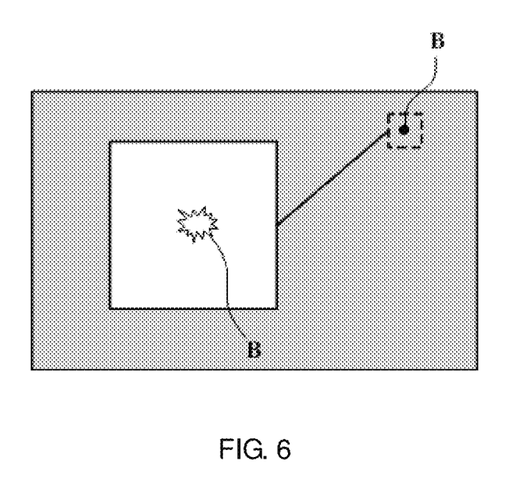
FIG. 6 is a schematic diagram showing an interface for light-on testing in one embodiment of the present invention.

A coordinate information is also displayed when the defect point is marked. The light-on apparatus controller 2 queries the fabrication system (FAB system) about the images of the defect points at the same coordinate in the tested panel 13 during a process manufacturing the tested panel 13. Please refer to FIG. 5, for example, at one check point in the manufacturing process of the tested panel 13, the defect point B is photographed and the image obtained from photographing is stored to the FAB system 5. As described above, the detection staff finds a defect point in the tested panel 13 during the light-on test, the position of the defect point as shown in the dashed box at the up-right corner of FIG. 6 is marked by the input apparatus 4, and the coordinate information of the defect point is displayed at the same time. According to the coordinate information, the light-on apparatus controller 2 queries and obtains the images of the tested panel, which are photographed during the manufacturing process and showing the defect point at the same coordinate, that is, the defect image shown in FIG. 5, and the defect image is acquired and displayed on the display panel 12. Although a plurality of images of a tested panel might be photographed during the manufacturing process, not all the images are images corresponding to the defect point found by the detection staff during the manufacturing process. Therefore, the necessary images can be found by the method described above, and are saved in the light-on apparatus controller 2 and the FAB system 5.

The defect image is displayed on the display panel 12, the detection staff could determine the cause of the defect in accordance with the defect image and experiences obtained from other light-on tests, and finally the defect image is saved as a resolved picture in the light-on controller 2 and transmitted to the FAB system 5.

Accordingly, in the embodiments of the present invention, the predetermined image displayed on the display panel 12 comprises the defect image of the tested panel 13 photographed during the manufacturing process, which is obtained by the light-on apparatus controller 2.

In the embodiment, besides the whole white image which is used as the backlight, the panel light-on testing system further comprises the input apparatus 4 electrically coupled to the light-on apparatus controller to mark the position of the defect point in the tested panel 13 during the light-on test. For example, the input apparatus 4 is a mouse.

Furthermore, the size of the display area of the display panel 12 is greater than or equal to the size of the display area of the tested panel 13. Accordingly, when the tested panels 13 with different sizes are replaced on the workbench 10, the display range of the display area of the display panel 12 can be adjusted correspondingly to achieve the purpose of light-proofing of other non-test panel areas on the workbench 10, avoiding replacing fixture, reducing time and energy consumption, and improving the efficiency of light-on test.

Figure 7:
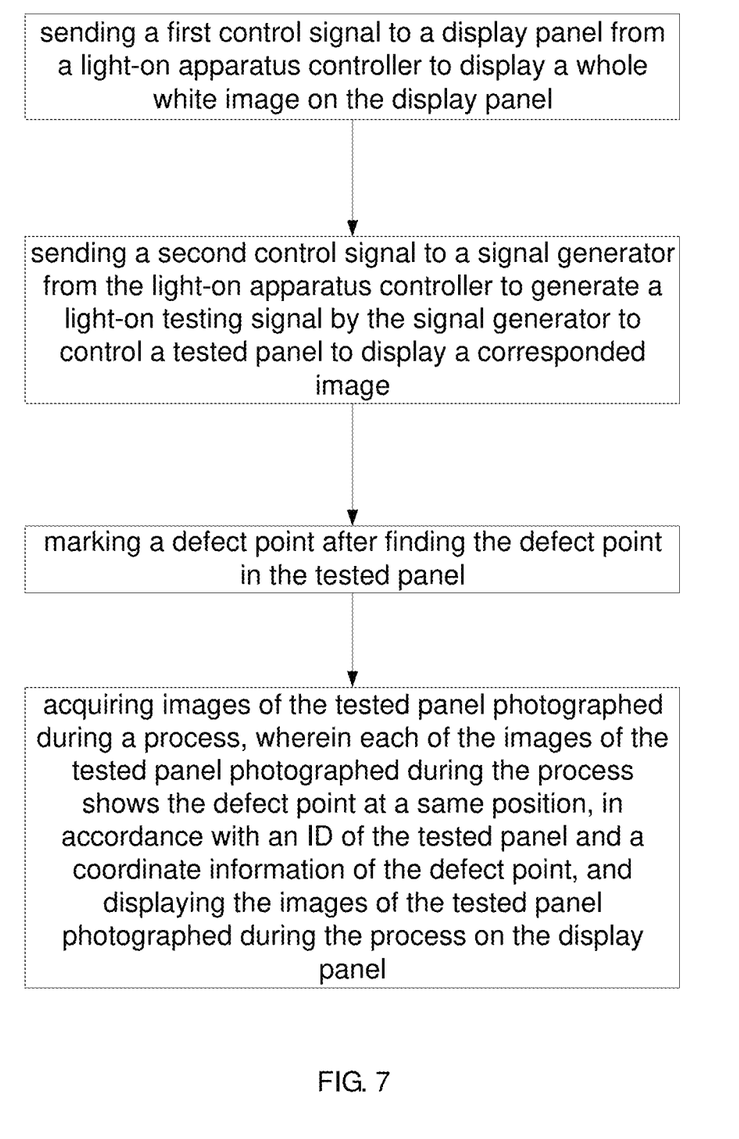
FIG. 7 is a flow chart of a panel light-on testing method in accordance with a third embodiment of the present invention.

Please refer to FIG. 7, the third embodiment of the present invention provides a panel light-on testing method corresponding to the second embodiment of the present invention. The panel light-on testing method comprises:

sending a first control signal to a display panel from a light-on apparatus controller to display a whole white image on the display panel;

sending a second control signal to a signal generator from the light-on apparatus controller to generate a light-on testing signal by the signal generator to control a tested panel to display a corresponded image;

marking a defect point after finding the defect point in the tested panel; and acquiring images of the tested panel photographed during a process, wherein each of the images of the tested panel photographed during the process shows the defect point at a same position, in accordance with an ID of the tested panel and a coordinate information of the defect point, and displaying the images of the tested panel photographed during the process on the display panel.

The embodiments of the present invention can be applied to light-on tests for the panels with difference sizes, and, besides the shorting bar test, they can be applied to the full contact test as well.

It can be known through the descriptions made above that the beneficial effects of the embodiments of the present invention are: through adding a display panel capable of displaying any image at bottom of the workbench of the panel light-on apparatus, not only a backlight for the detection panel, but also real-time displaying defect images detected during the process are provided to assist the detection staff in determining the cause of the defect; through marking by the input apparatus the defect point found in the panel light-on testing process, images of the tested panel photographed during the process, wherein each of the images of the tested panel photographed during the process shows the defect point at a same position, can be acquired for the detection staff to make a judgement; and the display range of the display panel can be adjusted in accordance with the variety sizes of different tested panels to achieve the purpose of light-proofing of other non-test panel areas on the workbench, avoiding replacing fixture, reducing time and energy consumption, and improving the efficiency of light-on test.

The foregoing contents are detailed description of the disclosure in conjunction with specific preferred embodiments and concrete embodiments of the disclosure are not limited to the description. For the person skilled in the art of the disclosure, without departing from the concept of the disclosure, simple deductions or substitutions can be made and should be included in the protection scope of the application.

What is claimed is:

1. A panel light-on apparatus, comprising
   a supporting member;
   a workbench provided on the supporting member to hold and secure a tested panel; and
   a display panel located at bottom of the workbench to provide a backlight to the tested panel and display a predetermined image, wherein the predetermined image is projected to the tested panel and overlapped with an image displayed by the tested panel;
   wherein a size of a display area of the display panel is greater than or equal to the size of the display area of the tested panel, and the light-on apparatus controller adjusts a display range of the display panel in accordance with the size of the display area of the tested panel.

2. A panel light-on testing system, comprising:
   a panel light-on apparatus, comprising:
      a supporting member;
      a workbench provided on the supporting member to hold and secure a tested panel; and
      a display panel located at bottom of the workbench to provide a backlight to the tested panel and display a predetermined image, wherein the predetermined image is projected to the tested panel and overlapped with an image displayed by the tested panel;
   a light-on apparatus controller electrically coupled to the display panel for controlling the display panel to display the predetermined image; and
   a signal generator electrically coupled to the light-on apparatus controller and the tested panel for generating a light-on testing signal to control the tested panel to display a corresponding image;
   wherein a size of a display area of the display panel is greater than or equal to the size of the display area of the tested panel, and the light-on apparatus controller adjusts a display range of the display panel in accordance with the size of the display area of the tested panel.

3. The panel light-on testing system according to claim 2, further comprising an input apparatus electrically coupled to the light-on apparatus controller to mark a defect point on the tested panel while performing light-on test on the tested panel.

4. The panel light-on testing system according to claim 3, wherein the light-on apparatus controller comprises a screen displaying simultaneously with the display panel, the input apparatus marks on the display panel a position corresponding to the defect point, and the screen displays a coordinate information of the defect point.

5. The panel light-on testing system according to claim 4, wherein the light-on apparatus controller further acquires images of the tested panel photographed during a process, wherein each of the images of the tested panel photographed during the process shows the defect point at a same position, in accordance with an ID of the tested panel and the coordinate information of the defect point, and displays the images of the tested panel photographed during a process on the display panel.

6. The panel light-on testing system according to claim 5, wherein the light-on apparatus controller saves and transmits the images of the tested panel photographed during the process, wherein each of the images of the tested panel photographed during the process shows the defect point at the same position, to a FAB system.

7. A panel light-on testing method, comprising:
   sending a first control signal to a display panel from a light-on apparatus controller to display a whole white image on the display panel;
   sending a second control signal to a signal generator from the light-on apparatus controller to generate a light-on testing signal by the signal generator to control a tested panel to display a corresponded image;
   marking a defect point after finding the defect point in the tested panel; and
   acquiring images of the tested panel photographed during a process, wherein each of the images of the tested panel photographed during the process shows the defect point at a same position, in accordance with an ID of the tested panel and a coordinate information of the defect point, and displaying the images of the tested panel photographed during the process on the display panel;
   wherein a size of a display area of the display panel is greater than or equal to the size of the display area of the tested panel, and the light-on apparatus controller adjusts a display range of the display panel in accordance with the size of the display area of the tested panel.

* * * * *